United States Patent [19]

Bach

[11] Patent Number: 4,645,798

[45] Date of Patent: Feb. 24, 1987

[54] BASIC DYEABLE ACRYLIC FIBER

[75] Inventor: Hartwig C. Bach, Pensacola, Fla.

[73] Assignee: Monsanto Company, St. Louis, Mo.

[21] Appl. No.: 779,020

[22] Filed: Sep. 23, 1985

[51] Int. Cl.$^4$ .................. C08L 33/20; C08L 25/06
[52] U.S. Cl. .................................. 525/192; 525/209; 525/212; 525/238; 525/344
[58] Field of Search ............... 525/192, 344, 212, 209, 525/238

[56] References Cited

U.S. PATENT DOCUMENTS

| | | | |
|---|---|---|---|
| 3,133,039 | 5/1964 | Davis et al. | 525/212 |
| 3,143,534 | 8/1964 | Herrick | 525/344 |
| 3,253,880 | 5/1966 | Lawson et al. | 525/344 |
| 3,366,711 | 1/1968 | Mazzolini et al. | 525/212 |
| 3,426,104 | 2/1969 | Masson | 525/212 |
| 3,442,825 | 5/1969 | Hodgdon et al. | 525/192 |
| 3,507,823 | 4/1970 | Trapasso et al. | 525/212 |
| 4,293,613 | 10/1981 | Bach et al. | 428/364 |

*Primary Examiner*—Carman J. Seccuro
*Attorney, Agent, or Firm*—John W. Whisler

[57] ABSTRACT

Acrylic fibers having good basic dyeability characteristics are provided. The fibers are composed of an acrylic polymer having a sulfonate-containing nonacrylic polymer, such as a partially sulfonated polystyrene, dispersed therein.

4 Claims, No Drawings

BASIC DYEABLE ACRYLIC FIBER

BACKGROUND OF THE INVENTION

A. Field of the Invention

This invention relates to novel acrylic fibers having good basic dyeability characteristics.

B. Description of the Prior Art

In general, the basic dyeability characteristics of acrylic fibers are less than desirable. It is known that the basic dyeability characteristics of certain acrylic fibers (e.g. fibers composed of the copolymer of acrylonitrile and vinyl acetate) can be improved by modifying the polymer from which the fibers are prepared to contain basic dye receptive groups (e.g. sulfonate groups) as an integral part of its polymeric structure. The modification is conveniently accomplished by preparing the acrylic polymer in the presence of a sulfonated monomer which is polymerizable with the acrylic polymer-forming monomers. However, the basic dyeability characteristics of certain other acrylic fibers (e.g. fibers of the copolymer of acrylonitrile and vinyl bromide) is not sufficiently improved by the foregoing modification.

SUMMARY OF THE INVENTION

In accordance with the present invention acrylic fibers are provided having good basic dyeability characteristics. The fibers comprise an acrylic polymer or blends of acrylic polymers having a sulfonate-containing, nonacrylic polymer dispersed therein (e.g. as a separate phase) in an amount sufficient to improve the basic dyeability of the fibers. By sulfonate-containing polymer is meant a polymer containing sulfonic acid groups (—SO$_3$H) or a salt thereof (e.g. the sodium or potassium salt thereof) as an integral part of its structure. In general, good results are obtained when the fiber comprises on a weight basis from 0.1 to 20 parts of the polymer per 100 parts of the acrylic polymer.

Surprisingly, fibers of the present invention containing

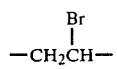

units as an integral part of their polymer structure have good basic dyeability characteristics, whereas corresponding fibers containing sulfonate groups as an integral part of the acrylic polymer structure and from which the sulfonate-containing polymer is omitted have poor basic dyeability characteristics.

DETAILED DESCRIPTION OF THE INVENTION

Acrylic polymers useful in forming the fibers of the present invention are copolymers of from 35% to 98% by weight of acrylonitrile and from 65% to 2%, respectively, of one or more other monomers containing the

linkage and copolymerizable therewith, such as methyl acrylate, methyl methacrylate, sodium sulfophenyl methallyl ether, etc.

Sulfonate-containing polymers useful in preparing acrylic fibers of the present invention are inert with acrylic polymers and contain sulfonate groups in an amount sufficient to improve the basic dyeability of the acrylic fiber but insufficient to render the polymer water soluble. In other words, the dispersed sulfonate-containing polymer must not be sulfonated to the extent that it is easily removable from the fiber by ordinary washing that are typically encountered during the processing of acrylic fibers. Such polymers include polymers of the formula

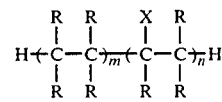

where R is a hydrocarbon radical (e.g. alkyl) or hydrogen and X is a sulfonate-containing radical, for example

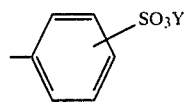

or

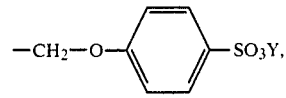

where Y is hydrogen or an alkali metal or the functional equivalent thereof. The preferred polymer is partially sulfonated polystyrene. Partially sulfonated polystyrene is obtained, for example, by reaction of polystyrene in solution with an appropriate solvent therefor (e.g. dichloromethane) with a limited amount of sulfonating agent such as chlorosulfonic acid. Less than about 50 percent of the available phenyl units are sulfonated to avoid water solubility or crosslinking of the sulfonated polystyrene. Partially sulfonated polystyrene prepared in this manner is water-insoluble, noncrosslinked and soluble in common solvents for acrylic polymers.

The fibers of the present invention are conveniently prepared by wet spinning techniques in which a spinning solution (dope) comprising an acrylic polymer of the foregoing description or a blend of such acrylic and a sulfonate-containing polymer of the foregoing description dissolved in an appropriate solvent therefor are extruded into a coagulation bath comprising water and solvent. Conventionally, the same solvent is used for both the coagulation bath and dope.

The concentration of the dope in terms of solids is typically about 20–25% by weight.

The concentration of the solvent in the coagulation bath may vary over a wide range, e.g., 40 to 80% by weight.

Suitable solvents for acrylic polymers are well known in the art. Preferred solvents are N,N-dimethyl acetamide (DMAc) and N,N-dimethyl formamide (DMF).

The following examples are given to further illustrate the invention. Unless otherwise indicated, percentages given in the examples are weight percentages.

In the examples the basic dye uptake (BDU) of fiber was determined by the following procedure: A weighed sample of the fiber (e.g. 0.3 g) is placed in a 100 ml round bottomed flask along with a magnetic stirring bar and 50 ml of a dye solution prepared by dissolving 1.00 g. of Sevron Blue 2 G and 1.0 g. of ammonium acetate in 1.8 l. of deionized water and then adjusting the pH to 5.2 with acetic acid and diluting to 2.0 l. (volumetric). The stirred mixture is heated at reflux for 2 hours. The flask is then cooled quickly to room temperature with an ice-water bath. The liquid portion is decanted into a 250 ml. volumetric flask and the fiber and flask are washed numerous times with a 1/1 (vol/vol) water/methanol solution until the flask is filled to the 250 ml. mark. A 10 ml. aliquot of the previous solution is placed in a 100 ml. volumetric flask and diluted to the mark with the 1/1 methanol/water solution. The transmittance ($T_1$) of the second solution is measured at 634 nm on a B and L Spectronic 70 spectrophotometer using a 1 cm polystyrene disposal cuvette. A 50 ml. aliquot of the original dye solution without fiber sample is handled in the same manner and the transmittance ($T_o$) is also measured at 634 nm. The corresponding absorbance values A are calculated with the formula:

$$A = \log \frac{100}{T}$$

The percent basic dye uptake was then calculated from the equation:

$$\% \; BDU = \frac{(A_0 - A_1)}{W_S} \times 32.552$$

where Ws equals the weight of the fiber sample.

EXAMPLE 1

This example describes a method for preparing partially sulfonated polystyrene (PSP) by the interaction of polystyrene (PS) with a sufficient amount of chlorosulfonic acid (CSA) to provide a CSA/PS mole ratio of 0.2/1.0.

The reaction was conducted in previously dried equipment consisting of a 5 liter, 3-necked, round-bottomed flask equipped with a stoppered, pressure-equalized dropping funnel, a true-bore stirrer and a condenser capped with a drying tube. Dried polystyrene (208.3 grams) was dissolved in 4036 grams of dichloromethane (dried over $K_2CO_3/CaCl_2$) by stirring at gentle reflux. After cooling to room temperature there was slowly added (2.5 hours) a solution of 46.6 grams (0.4 mole) of chlorosulfonic acid in 441 grams of dried dichloromethane. A pale pink/brown coloration and turbidity developed during the addition and eventually a two-phase system resulted. The mixture was stirred at ambient temperature overnight, at gentle reflux for several hours, then allowed to stand as it cooled. The solvent layer (bottom) was siphoned off and the rubbery solvent bloated product was triturated with 1.5 liters of hexane and then was placed in a 3 liter resin kettle and held under house vacuum for several days. The remainder of the solvent was removed by dividing into several portions and each portion being held in boiling water for ca. 0.5 hour. The boiling water treatment was repeated several times. The solid was vacuum dried, ground up and dried to give 213 grams of pale beige colored product. This material contained 4.7% sulfur or 1491 microequivalents of dye sites per gram of polymer and is referred to in subsequent examples as "PSP-1".

EXAMPLE 2

This example describes the preparation of a partially sulfonated polystyrene of a lower degree of sulfonation than the product of example 1 by using a CSA/PS mole ratio of 0.1/1.0 instead of 0.2/1.0.

The procedure was similar to that of Example 1 using a solution of 416.6 grams of polystyrene in 3919 grams of dichloromethane treated with 46.6 grams of chlorosulfonic acid dissolved in 399 grams of dichloromethane. The work-up and handling of the bloated product was similar to that of Example 1. The dried product was found to contain 3.17% sulfur which corresponds to 988 microequivalents of dye sites per gram of polymer. The degree of sulfonation is approximately 18% of the possible monosulfonation. This product is referred to in subsequent examples as "PSP-2".

EXAMPLE 3

This example describes the preparation of a 10% solution (dope) of partially sulfonated polystyrene described in Example 1 (PSP-1).

A 1-liter resin kettle equipped with a spiral stainless steel stirrer, a drying tube and stoppers was charged with 900 grams of dimethylacetamide (DMAc) and 100 grams of PSP-1. The mixture was stirred while the kettle was immersed in a water bath at 95° C. for 3 hours. A small quantity of undissolved material was filtered off and the pale yellow solution was stored for future use.

EXAMPLE 4

A 20% solution (dope) of PSP-2 was prepared by the procedure given in Example 3 using 800 grams of DMAc and 200 grams of PSP-2. The mixture was heated at 85° for 4 hours, then at room temperature overnight. A small amount of material remained undissolved. The solution was treated with 5 grams of Celite and filtered through Celite in a "coarse" fritted glass funnel. The yellow solution was stored for future use.

EXAMPLE 5

This example describes the preparation of a dope blend of PSP-1 and an acrylic polymer which is a copolymer having a specific viscosity of 0.15 and containing 93% acrylonitrile (AN) and 7% vinyl acetate (VA). This copolymer is referred to hereinafter as "Acrylic Polymer A". The dope contained 20% total solids of which 95% was Acrylic Polymer A and 5% was PSP-1.

A 3-liter resin kettle equipped with a helical stainless steel stirrer, a drying tube (calcium chloride) and stoppers was charged with 1704 grams of dimethyl acetamide (DMAc) and 456 grams of Acrylic Polymer A was added and the mixture was stirred at room temperature for 3 hours. To this dope was added 240 grams of the 10% solution of PSP-1 prepared as described in Example 3. Turbidity developed upon mixing, but the new dope soon became transparent (yellow color). After stirring overnight the dope was transferred to a spin pot and pressurized to degas prior to wet-spinning. The light amber dope had a Brookfield viscosity at room temperature of 336 poise.

EXAMPLE 6

This example describes preparation of acrylic fiber of the present invention.

The dope of Example 5 was extruded through a 25-hole, 3 mil (0.0762 mm), spinnerette immersed in a DMAc/H₂O coagulation bath (57%/43%) maintained at 38° C. to form a tow at a jet stretch of 0.55. The tow after traveling 43.2 cm immersed in the bath liquid was withdrawn from the bath and passed through a series of boiling water baths (cascade) in which the tow was washed, stretched (cascade stretched) six times (6X) and a finish applied thereto in the last bath to facilitate further processing of the tow. The tow was then dried on steam heated rolls at 115° C. under tension.

A control dope containing only Acrylic Polymer A in DMAc at 20% total solids concentration was prepared and also spun into tow under the conditions described above.

The BDU of the as-spun fiber of the present invention was 10.8% while that of the as-spun control fiber was 8.3. A sample of each of these fibers was annealed in a closed vessel with steam under pressure in a conventional manner. The BDU of the annealed fiber made in accordance with the present invention was 16.7 while that of the annealed control fiber was 8.7%.

EXAMPLE 7

A dope was prepared according to the procedure of Example 4 using 429 grams of DMAc, 93.5 grams of an acrylic copolymer (Acrylic Polymer B) containing 91% AN and 9% vinyl bromide, and 165 grams of a 10% DMAc solution of PSP-1 prepared as described in Example 3. The dope contained 20% total solids of which 85% was Acrylic Polymer B and 15% was SPS-1.

The dope was wet spun into a 60%/40% (DMAc/water) coagulation bath at room temperature using the conditions described in Example 6. The as-spun tow was annealed by drawing it over a 175° C. hot-shoe. A control dope containing only Acrylic Polymer B at 20% solids was prepared and also spun into tow and annealed under the above conditions. The tow of the present invention containing SPS had a BDU of 35.7% while the control tow had a BDU of only 0.8%.

For purposes of comparison a tow was prepared from a solution blend of 85% Acrylic Polymer B and 15% acrylic copolymer of 84% AN, 6% vinyl bromide and 10% SPME in DMAc and annealed using the same procedure described in Example 7. The resulting tow had a BDU of only 3.8%.

The results given in the above examples demonstrate that the acrylic fiber of the present invention has good basic dyeability characteristics as compared to unmodified acrylic fiber and significantly better basic dyeability as compared to certain bromine-containing acrylic fibers modified to contain dye receptive groups (i.e. sulfonate groups) as an integral part of their polymeric structure.

I claim:

1. An acrylic fiber comprising a copolymer of 35 to 98 percent by weight of acrylonitrile and 65 to 2 percent by weight, respectively, of one or more other monomers containing the

linkage andd copolymerizable with acrylonitrile or a blend of such copolymers, said fiber being characterized in having partially sulfonated polystyrene dispersed therein in an amount sufficient to improve the basic dyeability of said fiber.

2. The fiber of claim 1 wherein said copolymer is a copolymer of acrylonitrile and vinyl acetate.

3. The fiber of claim 1 wherein said copolymer is a copolymer of acrylonitrile and vinyl bromide.

4. The fiber of claim 1 wherein said fiber comprises said partially sulfonated polystyrene in an amount ranging from 0.1 part to 20 parts by weight per 100 parts by weight of said copolymer.

* * * * *